United States Patent

Parl et al.

[11] Patent Number: 5,867,296
[45] Date of Patent: Feb. 2, 1999

[54] LIGHT BEAM DEFLECTION APPARATUS HAVING ELEMENT FOR REDUCING AIR TURBULENCE

[75] Inventors: Klaus Ulrich Parl; Eckhard Lindemann, both of Raisdorf, Germany

[73] Assignee: Linotype-Hell AG, Eschborn, Germany

[21] Appl. No.: 765,370

[22] PCT Filed: May 8, 1996

[86] PCT No.: PCT/DE96/00795

§ 371 Date: Mar. 19, 1997

§ 102(e) Date: Mar. 19, 1997

[87] PCT Pub. No.: WO96/35974

PCT Pub. Date: Nov. 14, 1996

[30] Foreign Application Priority Data

May 13, 1995 [DE] Germany ............... 195 17 629.4

[51] Int. Cl.⁶ .................................................. G02B 26/08
[52] U.S. Cl. ...................... 359/196; 359/198; 359/211; 359/212
[58] Field of Search ........................... 359/211, 212, 359/198, 226, 831, 833, 196

[56] References Cited

U.S. PATENT DOCUMENTS

| 2,894,065 | 7/1959 | Wise . | |
|---|---|---|---|
| 4,943,128 | 7/1990 | Takada et al. | 359/220 |
| 5,526,168 | 6/1996 | Parl | 359/226 |
| 5,589,973 | 12/1996 | King et al. | 359/214 |
| 5,600,477 | 2/1997 | Pepe | 359/220 |

FOREIGN PATENT DOCUMENTS

| 0 683 415 A1 | 3/1995 | European Pat. Off. . |
| 41 24 229 A1 | 1/1993 | Germany . |

Primary Examiner—Cassandra C. Spyrou
Assistant Examiner—Mark A. Robinson
Attorney, Agent, or Firm—Hill & Simpson

[57] ABSTRACT

A light beam deflection unit is formed of a light-transmissive deflection prism extending in the direction of an optical axis and of a carrier prism. The deflection prism has a light entry face oriented essentially perpendicular to the optical axis, a reflection face proceeding obliquely relative to the optical axis and a light exit face. The carrier prism is joined to the deflection prism at the reflection face and supplements the latter to form a composite unit essentially symmetrical relative to the optical axis that is seated rotatable around the optical axis. For the purpose of reducing air turbulence upon rotation of the composite unit, a hollow-cylindrical element whose cylinder axis essentially coincides with the optical axis and whose inside diameter at least corresponds to the diameter of the light beam incident onto the light entry face and that is connected to the composite unit is arranged in front of the light entry face. Position errors of the deflected light beam are minimized due to the reduction of air turbulence, as a result whereof a uniform exposing and, thus, a high reproduction quality are achieved given employment of the light beam deflection unit in a recording apparatus.

19 Claims, 4 Drawing Sheets

LIGHT BEAM DEFLECTION APPARATUS HAVING ELEMENT FOR REDUCING AIR TURBULENCE

BACKGROUND OF THE INVENTION

The invention is in the field of electronic reproduction technology and is directed to a light beam deflection unit in a scanner device for an apparatus for scanning masters or for a recording apparatus. Such a scanner device essentially comprises a light source for generating a light beam, a deflection unit for the light beam and an optical unit for correcting the light beam.

In a master scanning apparatus, also referred to as input scanner, a light beam generated in a scanner device is conducted point-by-point and line-by-line across an original to be scanned, and the scan light reflected from the original or allowed to pass therethrough is converted into an image signal in an optoelectronic transducer. In a recording apparatus, also referred to as a recorder, exposer or output scanner, the light beam for recording information acquired in a scanner device is intensity-modulated by an image signal and is conducted point-by-point and line-by-line over a light-sensitive recording material.

In the case of a flat bed apparatus, the holder for the master or for the recording material is a plane surface over which the light beam is conducted point-by-point and line-by-line, and that moves relative to the scanner device. In the case of an inside drum apparatus, the holder for the master or for the recording material is designed as a stationary half shell or trough. The scanner device moves parallel to the longitudinal axis of the holder, and the light beam is conducted radially across the master or the recording material perpendicular to the longitudinal axis.

An inside drum recording apparatus is disclosed, for example, by EP-A-0 354 028. The light beam deflection unit therein is designed as a mirror surface arranged transversely relative to the light propagation direction, and is connected to a shaft turning around a rotational axis. The rotating mirror surface deflects the light beam across the recording material point-by-point and line-by-line.

During operation of the recording apparatus, contaminants can collect at the mirror surface, and air turbulences can arise at high speeds due to the asymmetrical design of the light beam deflection unit with reference to the rotational axis. The air turbulences lead to disturbing noises and contamination in the region of the mirror surface. Beyond this, the air turbulences can exert alternating pressures on the bearing for the rotational axis that can cause slight shifts in the position of the mirror surface and, thus, of the deflected light beam on the recording material. Further, the optical path of the light beam in the light deflection unit can be influenced by the air turbulences, so that additional shifts in the position of the light beam on the recording material can arise. Such positional errors of the light beam lead to non-uniform exposures on the recording material, as a result of which the reproduction quality is disadvantageously deteriorated, given a high-quality recording apparatus.

DE-A-41 24 229 discloses a light beam deflection unit with a light entry face and a light exit face for the perpendicularly deflected light beam that is composed of a rotationally seated carrier prism and of a light-transmissive deflection prism that extends in the direction of a rotational axis. The face of the deflection prism adjoining the carrier prism is designed as a reflection surface that proceeds transversely relative to the rotational axis. The deflection prism is glued to the carrier prism, and the two prisms supplement each other, at least in regions, to form a unit that is symmetrical relative to the rotational axis. Disk-shaped cover elements that project beyond the unit in the radial expanse are arranged to the side of the unit.

Given this light beam deflection unit, the cover elements in fact result in slight air turbulences, dirt and unquiet running as well; however, the positional errors of the deflected light beam caused by air turbulence cannot be entirely avoided. Further, the manufacture of the cover elements is comparatively involved since they must be precisely manufactured and precisely centered at the unit.

DE-A41 30 977 discloses another light beam deflection unit that is composed of a transparent member designed as a spherical segment and of a carrier member that is likewise designed as a spherical segment and that is glued to the transparent member at the reflection layer. The transparent member comprises a light entry face, a reflection face and a light exit face. The unit formed of the transparent member and the carrier member is rotatable around an axis that resides perpendicular to the light entry face and comprises an outside contour that is dynamically balanced, at least with reference to the axis. As a result of the spherical design of the unit, this light beam deflection unit can in fact rotate at a relatively high speed without creating substantial running noises; nonetheless, air turbulences can occur, these likewise disadvantageously causing disturbing positional errors of the light beam.

SUMMARY OF THE INVENTION

It is an object of the invention to improve a light beam deflection unit such that, in addition to avoiding running noises and contamination, disturbing positional errors of the deflected light beam due to air turbulence are, in particular, also avoided to the farthest-reaching extent.

According to the invention, an apparatus is provided for deflection of a light beam. A light-transmissive deflection prism extends in a direction of an optical axis, the prism having a light entry face oriented substantially perpendicular to the optical axis, reflection face proceeding obliquely relative to the optical axis, and a light exit face. A carrier prism is joined to the deflection prism at the reflection face, and which supplements the deflection prism to form a composite unit substantially symmetrical with reference to the optical axis and which is seated rotatably around the optical axis. An element envelopes the light beam and is arranged in front of the light entry face for reducing air turbulence upon rotation of the composite unit.

The invention is explained in greater detail below with reference to FIGS. 1 through 5.

DESCRIPTION OF THE PREFERRED EMBODIMENTS

Figure 1:
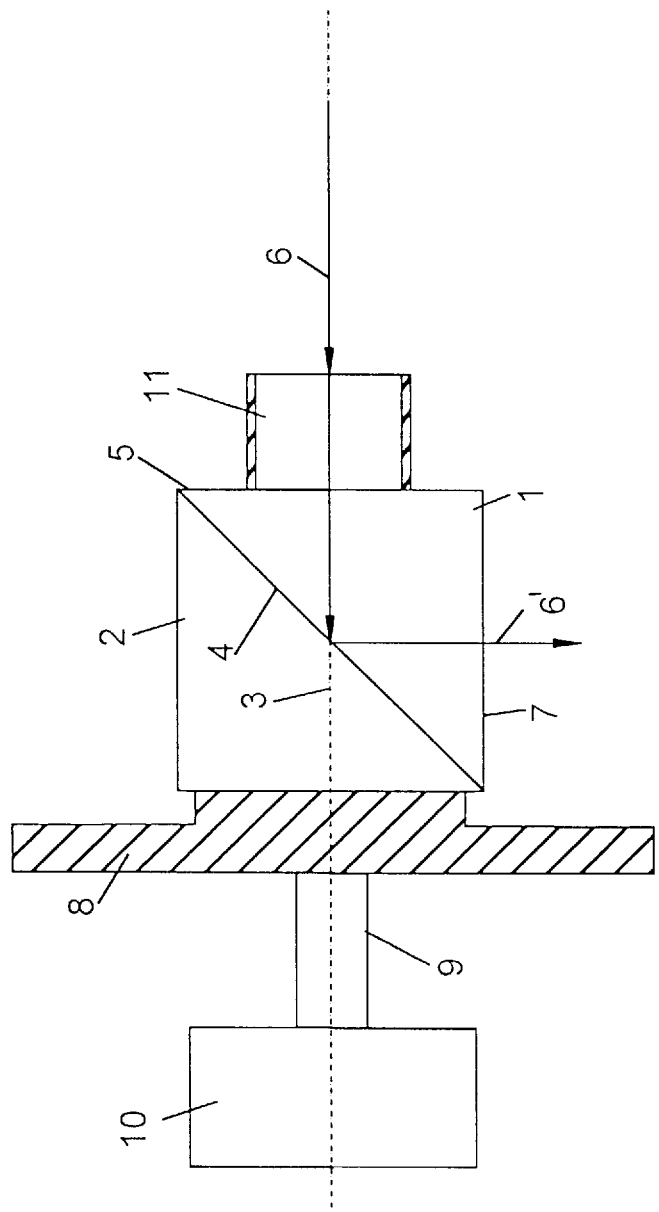
FIG. 1 is a first exemplary embodiment of a light beam deflection unit, in section.

FIG. 1 shows a first exemplary embodiment of a light beam deflection unit in section within a scanner device (not shown in detail) for a master scanning apparatus or for a recording apparatus. The light beam deflection unit is essentially composed of a transparent deflection prism 1 and a carrier prism 2 that supplements the deflection prism 1 to form an essentially cubic or cuboid, compact composite unit 1,2 that is dynamically balanced relative to an optical axis 3. The abutting faces of deflection prism 1 and carrier prism 2 are, for example, connected to one another by gluing.

The face of the deflection prism 1 adjoining the carrier prism 2 is designed as a reflection face 4 that proceeds at an angle of inclination of about 40°–50° relative to the optical axis 3. The deflection prism 1 further comprises a light entry face 5 arranged perpendicular to the optical axis 3 for a light beam 6 incident in the direction of the optical axis 3 and a light exit face 7 oriented essentially parallel to the optical axis 3 for the light beam 6' reflected at the reflection face 4. The reflected light beam 6' is deflected across an object plane (not shown). In the case of a master scanner apparatus, an original to be scanned is located on the object plane, and a recording material to be exposed is located thereon in the case of a recording apparatus.

The composite unit 1,2 formed of deflection prism 1 and carrier prism 2 has a surface of the carrier prism 2 secured to a disk-shaped receptacle 8, for example by gluing. The receptacle 8 is connected via a shaft 9 to a drive 10 that turns the unit 1,2 around the optical axis 3 as a rotational axis.

According to the invention, an element 11 that envelopes the light beam 6 impinging the light entry face 5 is arranged preceding the light entry face 5. The element 11 can be fabricated, for example, of a metal such as titanium. The element 11 increases the aerodynamic resistance for the air flowing around the light beam deflection unit, the disturbing air turbulences being reduced as a result thereof. Due to the reduced air turbulences, the path of the light beam is advantageously stabilized and the afore-mentioned positional errors of the deflected light beam 6' in the object plane are minimized, so that a uniform exposure and, thus, a high recording quality is achieved in the case of a recording apparatus.

The element 11 can be stationarily arranged at a slight distance from the light entry face 5 or, as shown in the exemplary embodiments, can also be connected to the rotating composite unit 1,2, for example by gluing. In this case, the element 11 is preferably designed dynamically balanced and the symmetry axis essentially coincides with the optical axis 3 of the light beam deflection unit.

The inside diameter of the element 11 can be constant over the length thereof or, on the other hand, can vary according to a function, whereby the minimal inside diameter at least corresponds to the diameter of the light beam 6. Given a constant inside diameter, the element 11 has the form of a hollow cylinder and can also be referred to as a ring, sleeve or tube. This form of the element 11, referred to as a tube below, is realized in the illustrated exemplary embodiments the tubular element 11 is a thin-walled tubular element and has its outer diameter substantially less than an outer diameter of the deflection prism 1 at the light entry face 5 as shown in FIG. 1.

In some instances, however, it can be expedient to employ an element 11 whose inside diameter varies according to a function in order to achieve an especially aerodynamic effect. In this case, the element 11 can, for example, assume the form of a nozzle or of a funnel.

Figure 2:
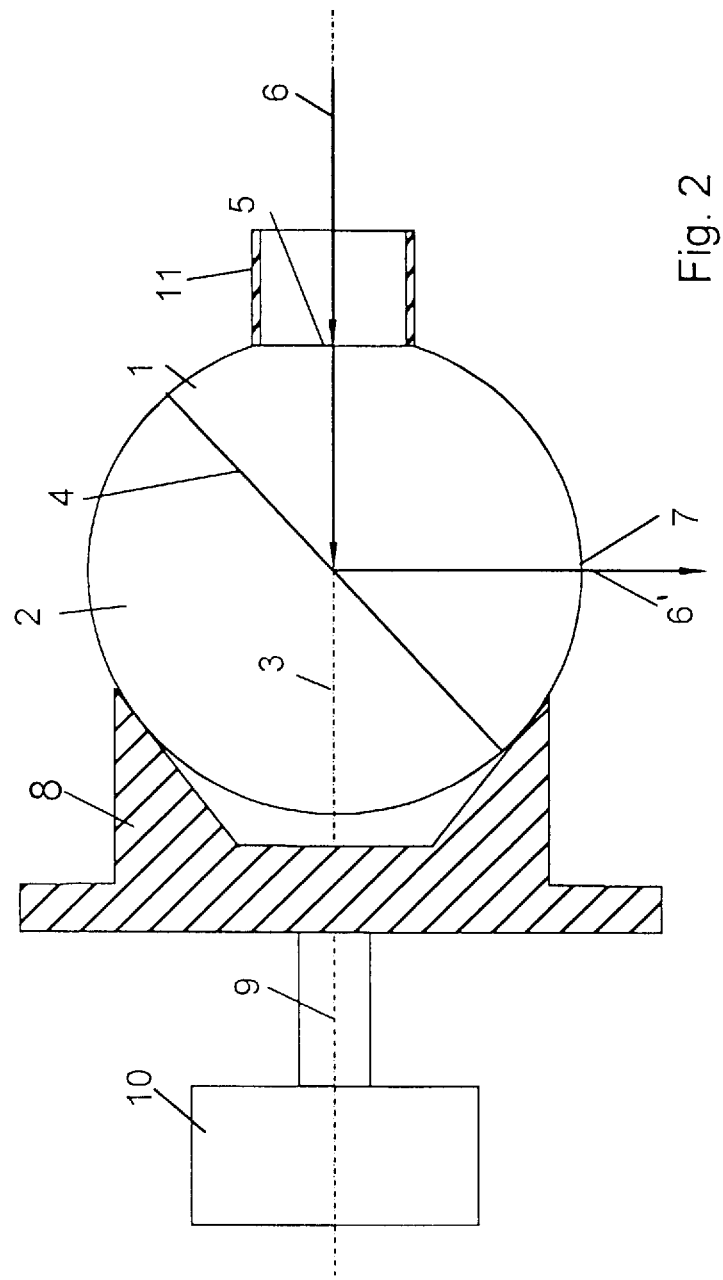
FIG. 2 is a second exemplary embodiment of a light beam deflection unit, in section.

FIG. 2 shows a second exemplary embodiment of a light beam deflection unit in section. The light beam deflection unit is again composed of a transparent deflection prism 1 and of a carrier prism 2. At least in regions, deflection prism 1 and carrier prism 2 are designed as spherical segments and supplement one another to form an essentially spherical composite unit 1,2 that turns around an optical axis 3. The abutting faces of deflection prism 1 and carrier prism 2 can likewise be joined to one another by gluing.

The face of the deflection prism 1 adjoining the carrier prism 2 is again designed as a reflection face 4 that proceeds with an angle of inclination of about 40°–50° relative to the optical axis 3. The deflection prism 1 further comprises a planar light entry face 5 arranged perpendicular to the optical axis 3 for a light beam 6 incident in the direction of the optical axis, and an arced light exit face 7 for the light beam 6' reflected at the reflection face 4. The composite unit 1,2 formed of deflection prism 1 and carrier prism 2 has a face of the carrier prism 2 secured by gluing in a cup-shaped receptacle 8. The receptacle 8 is connected via a shaft 9 to a drive 10 that turns the composite unit 1,2 around the optical axis 3.

For increasing the aerodynamic resistance for the air flowing around the light beam deflection unit, the inventive tube 11 of the invention is again arranged in front of the light entry face 5 and is connected thereto.

In the embodiment of FIG. 2, the light entry face 5 can also comprise an inside arch. A lens effect can thus be produced that compensates the lens effect caused by the arced design of the light exit face 7. A planar light exit face with a lens placed in front of it can also be employed, instead of an arced light exit face 7.

Given an angle of inclination of the reflection face 4 of 45° relative to the optical axis 3, the reflected light beam 6' departs the composite unit 1,2 at a deflection angle of 90° relative to the incident light beam 6. A deflection angle of 90°, however, can lead to disturbing light reflections that are reflected back from the object plane into the light beam deflection unit.

In order to avoid such light reflections, a deflection angle deviating from 90° by approximately 1° to 5° is expedient; in the exemplary embodiments of FIGS. 1 and 2, this can be achieved by an inclination of the reflection faces 4 relative to the optical axis 3 that deviates from 45°.

Figure 3:
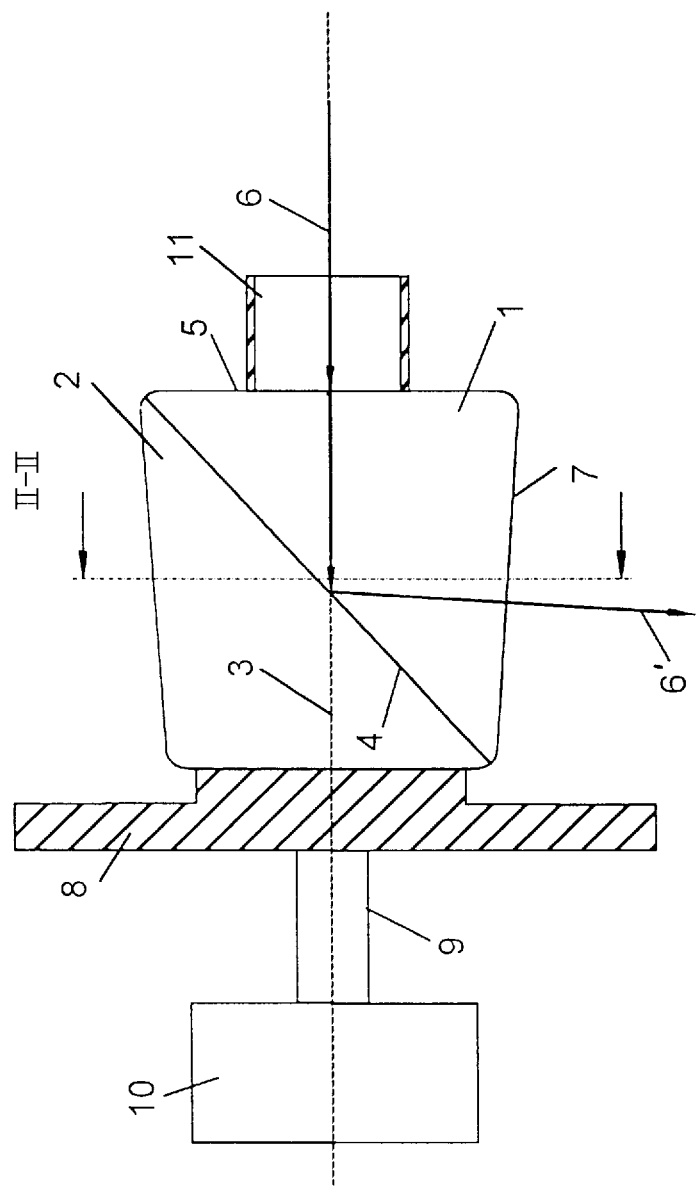
FIG. 3 is a third exemplary embodiment of a light beam deflection unit, in section.
Figure 4:
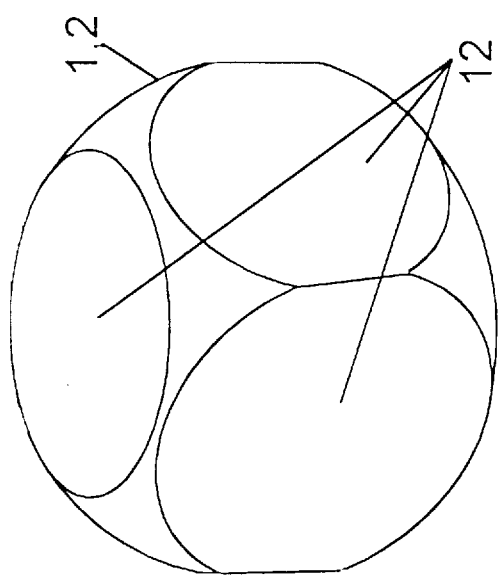
FIG. 4 is a perspective view.

FIG. 3 shows a third exemplary embodiment of a light beam deflection unit in section. The exemplary embodiment of FIG. 3 differs from the exemplary embodiment of FIG. 1 in that the edges and the corners of the cubic or, respectively, cuboid composite unit 1,2 that are not optically employed are rounded off in order to improve the aerodynamic properties with respect to the creation of air turbulence and running noises. As a result thereof, the planar outside surface 12 of the composite unit 1,2 assumes a nearly circular shape, as may be seen from the perspective view in FIG. 4. For further improvement of the aerodynamic properties, spherical caps 13,14,15 or, respectively, spherical segments are attached to at least two of the three unused outside surfaces 12 of the composite unit 1,2, whereby the utilized outside surfaces are the light entry face 5, the light exit face 8 and that outside surface that is joined to the receptacle 8. The spherical caps 13,14,15 are joined to the composite unit 1,2, for example by gluing, and lend regions thereof an essentially spherical outside contour. The tube 11 of the invention is again arranged in front of the light entry face 5.

In order to avoid back reflections into the light beam deflection unit the reflection face 4 has an inclination deviating slightly from 45°, as a result whereof the emerging light beam 6' exhibits a deflection angle that deviates from 90°. The optical condition that the light exit face 7 should be oriented perpendicular to the emerging light beam 6' is achieved in the illustrated exemplary embodiment by a corresponding inclination of the light exit face 7 relative to the optical axis 3. In order to obtain the rotational symmetry of the composite unit 1,2 formed of deflection prism 1 and carrier prism 2, the outside surface of the carrier prism 2 lying opposite the light exit face 7 is likewise inclined, so that the shape of the composite unit 1,2 deviates slightly from a cube or, respectively, a cuboid.

Figure 5:
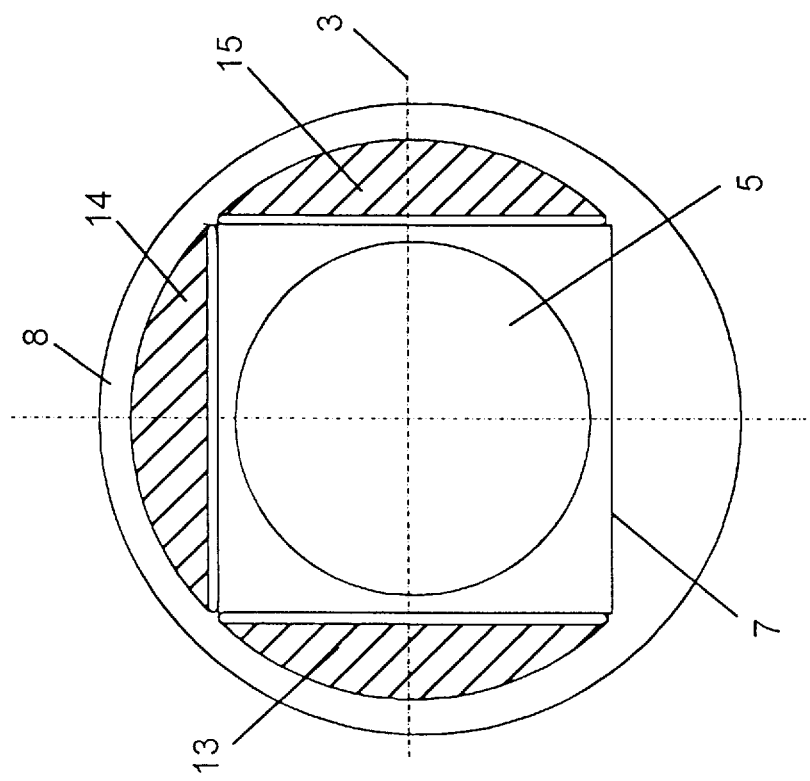
FIG. 5 is a side view along the direction of view II—II in FIG. 3.

FIG. 5 shows a side view along the direction of view II—II in FIG. 3 in which the light entry face 5 and the light exit face 7 are visible as utilized outside surfaces 12 of the composite unit 1,2. The side view also shows the three spherical caps 13,14,15 applied to the unused outside surfaces 12. The spherical caps 13,14 applied to the lateral outside surfaces 12 also improve the strength of the connection between deflection prism 1 and carrier prism 2 since the base areas of the spherical caps 13,14 hold the two prisms 1,2 together with an additional glued connection.

The spherical caps 13,14,15 can, for example, be fabricated of glass, metal or of a lightweight, porous material. Commercially obtainable optical lenses can also be employed as spherical caps.

In all three exemplary embodiments, for example, the deflection prism 1 is composed of glass and the carrier prism 2 is composed of a non-transparent material, for example of ceramic, a metal such as aluminum or of a metal alloy. Deflection prism 1 and carrier prism 2 are expediently fabricated of materials with approximately the same specific weight in order to obtain a symmetrical mass distribution that reduces the dynamic stress on the light beam deflection unit at high speeds. Given employment of different materials for deflection prism 1, carrier prism 2 and tube 11, it is expedient when the materials exhibit at least approximately the same coefficient of thermal expansion in order to avoid shearing forces in the region of the connections.

Although various minor changes and modifications might be proposed by those skilled in the art, it will be understood that our wish is to include within the claims of the patent warranted hereon all such changes and modifications as reasonably come within our contribution to the art.

We claim:

1. An apparatus for deflection of a light beam, comprising:
    a light-transmissive deflection prism extending in a direction of an optical axis, said prism having a light entry face oriented substantially perpendicular to the optical axis, a reflection face proceeding obliquely relative to the optical axis and a light exit face;
    a carrier prism joined to the deflection prism at the reflection face and which supplements the deflection prism to form a composite unit substantially symmetrical with reference to the optical axis and which is seated rotatably about the optical axis; and
    a rotation-symmetric hollow cylindrical thin wall tubular element enveloping the light beam and arranged in front of and attached to the light entry face rotating with the composite unit for reducing air turbulence upon rotation of the composite unit, the element having a symmetry axis coinciding with the optical axis, and an outside diameter substantially less than an outer diameter of the prism at the light entry face.

2. The apparatus according to claim 1 wherein the element is dynamically balanced.

3. The apparatus according to claim 1 wherein the composite unit formed of the deflection prism and the carrier prism is substantially cubic.

4. The apparatus according to claim 1 wherein the deflection prism and the carrier prism are substantially spherical segments, and the composite unit having a substantially spherical outside contour.

5. The apparatus according to claim 1 wherein two spherical caps are arranged at outside surfaces of the composite unit formed of faces of both prisms.

6. The apparatus according to claim 1 wherein an outside surface of the composite unit lying opposite the light entry face is connected to a rotationally driven receptacle.

7. The apparatus according to claim 1 wherein the deflection prism is comprised of glass.

8. The apparatus according to claim 1 wherein the carrier prism is comprised of a light-impermeable material.

9. The apparatus according to claim 8 wherein the light-impermeable material comprises a metal.

10. The apparatus according to claim 9, wherein the metal comprises titanium.

11. The apparatus according to claim 1 wherein the deflection prism and the carrier prism are joined to one another by gluing.

12. The apparatus according to claim 1 wherein the deflection prism, the carrier prism and the element are formed of materials having approximately same specific weights.

13. The apparatus according to claim 1 wherein the deflection prism, the carrier prism and the element are formed of materials with approximatey same temperature coefficients.

14. The apparatus according to claim 1 wherein:
    the reflection face comprises an angle of inclination of approximately 45° relative to the optical axis; and
    the light entry face and the light exit face describe an angle of approximately 90°.

15. The apparatus according to claim 1 wherein:
    the reflection face comprises an angle of inclination relative to the optical axis that deviates from 45°; and
    the light exit face is aligned due to an inclination deviating from 90° relative to the light entry face such that the light beam reflected by the reflection face passes perpendicularly therethrough.

16. An apparatus for deflection of a light beam, comprising:
    a light-transmissive deflection prism extending in a direction of an optical axis, said prism having a light entry face oriented substantially perpendicular to the optical axis, a reflection face proceeding obliquely relative to the optical axis, and a light exit face;
    a carrier prism joined to the deflection prism at the reflection face and which supplements the deflection prism to form a composite unit substantially symmetrical with reference to the optical axis and which is seated rotatably about the optical axis;
    a thin wall tubular element enveloping the light beam and arranged and attached at a front of the light entry face for reducing air turbulence upon rotation of the composite unit, said tubular element having an outer diameter substantially less than an outer diameter of the deflection prism at the light entry face;
    the composite unit formed of the deflection prism and the carrier prism being substantially cubic;
    optically unused edges and corners of the composite unit being rounded off; and spherical caps that, at least in regions, supplement a contour of the composite unit to form a spherical outside contour are attached to at least two of unused outside surfaces of the composite unit.

17. The apparatus according to claim 16 wherein the spherical caps are joined to the outside surfaces of the composite unit by gluing.

18. The apparatus according to claim 16 wherein optical lenses are employed as the spherical caps.

19. An apparatus for deflection of a light beam, comprising:

a light-transmissive deflection prism extending in a direction of an optical axis, said prism having a light entry face, reflection face, and a light exit face;

a carrier prism being mated to the deflection prism at the reflection face, the carrier prism and deflection prism together forming a composite unit substantially symmetrical with reference to the optical axis and which is seated rotatably about the optical axis;

the light entry face being arranged so that the light beam passing along the optical axis can enter the light entry face, the reflection face being arranged to reflect the light beam received through the light entry face, and the reflection face and light exit face being arranged so that the light beam reflected at the reflection face passes out of the prism at the light exit face; and a rotation-symmetric hollow thin wall tubular cylindrical element around the light beam and extending substantially from the light entry face where the element is attached outwardly from the light entry face along the optical axis for reducing air turbulence upon rotation of the composite unit, the element rotating with the composite unit and having a symmetry axis coinciding with the optical axis, and the tubular element having an outer diameter which is substantially less than an outer diameter of the deflection prism at the light entry face.

\* \* \* \* \*